US010155448B2

(12) United States Patent
Michaelides et al.

(10) Patent No.: US 10,155,448 B2
(45) Date of Patent: Dec. 18, 2018

(54) METHOD AND SYSTEM FOR CONTROLLING AN ISOLATED HV CIRCUIT

(71) Applicant: JAGUAR LAND ROVER LIMITED, Warwickshire (GB)

(72) Inventors: Alexandros Michaelides, Coventry (GB); Adrian Berry, Coventry (GB); Simon Johnson, Coventry (GB); Toby Heason, Coventry (GB); Chris Green, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 247 days.

(21) Appl. No.: 14/911,473

(22) PCT Filed: Aug. 7, 2014

(86) PCT No.: PCT/EP2014/066961
§ 371 (c)(1),
(2) Date: Feb. 11, 2016

(87) PCT Pub. No.: WO2015/022256
PCT Pub. Date: Feb. 19, 2015

(65) Prior Publication Data
US 2016/0200196 A1    Jul. 14, 2016

(30) Foreign Application Priority Data
Aug. 14, 2013    (GB) .................................. 1314554.5

(51) Int. Cl.
*B60L 9/00*    (2006.01)
*B60L 11/14*    (2006.01)
(Continued)

(52) U.S. Cl.
CPC ............. *B60L 11/14* (2013.01); *B60L 3/0046* (2013.01); *B60L 3/0069* (2013.01);
(Continued)

(58) Field of Classification Search
CPC ....... B60L 11/14; B60L 3/0046; B60L 3/0069
See application file for complete search history.

(56) References Cited

U.S. PATENT DOCUMENTS 4,626,750 A * 12/1986 Post .................... B60L 11/1805
318/139
4,719,361 A * 1/1988 Brubaker ................ B60L 11/06
290/14

(Continued)

FOREIGN PATENT DOCUMENTS

CN    1712268 A    12/2005
CN    101722859 A    6/2010
(Continued)

OTHER PUBLICATIONS

International Search Report and Written Opinion of the International Searching Authority for International applicaiton No. PCT/EP2014/066961 dated Feb. 26, 2015.
(Continued)

*Primary Examiner* — Adam M Alharbi

(57) ABSTRACT

A method of controlling an isolated high voltage circuit of a vehicle comprising the high voltage circuit and a low voltage circuit wherein the high voltage circuit is isolated from the low voltage circuit, the method comprising: detecting a change in an isolation resistance of the high voltage circuit from the low voltage circuit; determining a speed of the vehicle; operating the high voltage circuit in dependence on the change in the isolation resistance and the speed of the vehicle.

19 Claims, 3 Drawing Sheets

(51) Int. Cl.
*B60L 3/00* (2006.01)
*B60L 11/18* (2006.01)

(52) U.S. Cl.
CPC ....... *B60L 11/1861* (2013.01); *B60L 11/1868* (2013.01); *B60L 2210/10* (2013.01); *B60L 2240/12* (2013.01); *B60L 2240/80* (2013.01); *B60L 2250/10* (2013.01); *B60L 2250/16* (2013.01); *B60L 2250/26* (2013.01); *Y02T 10/70* (2013.01); *Y02T 10/7005* (2013.01); *Y02T 10/7044* (2013.01); *Y02T 10/7066* (2013.01); *Y02T 10/7077* (2013.01); *Y02T 10/7216* (2013.01)

(56) References Cited

U.S. PATENT DOCUMENTS 8,214,120 B2 * 7/2012 Kothari ................ B60W 20/10
   180/65.21
8,606,447 B2 * 12/2013 Namuduri ............ B60W 20/00
   701/22
2002/0195290 A1 12/2002 Hayakawa
2011/0215639 A1 9/2011 Kurosaki
2012/0274131 A1 11/2012 Makino
2012/0280697 A1 11/2012 Morimoto
2013/0076129 A1 3/2013 Kunimitsu et al.

FOREIGN PATENT DOCUMENTS

CN 102756654 A 10/2012
GB 2346020 A 7/2000
JP 2007300753 11/2007
JP 2012249478 A 12/2012

OTHER PUBLICATIONS

Combined Search and Evaluation Report under Sections 17 and 18(3) for Application No. GB1413971.1 dated Feb. 6, 2015.
Combined Search and Evaluation Report under Sections 17 and 18(3) for Application No. GB1314554.5 dated Dec. 3, 2013.
Search Report for CN Application No. 201480050632.7 dated Dec. 6, 2016.

* cited by examiner

METHOD AND SYSTEM FOR CONTROLLING AN ISOLATED HV CIRCUIT

The present invention relates to a method and system for controlling an isolated high voltage (HV) circuit and particularly, but not exclusively, a system and method for controlling an isolated HV circuit of a vehicle, and a vehicle having an isolated HV circuit.

BACKGROUND

High voltage (HV) circuits are often used in vehicles such as hybrid electric vehicles (HEVs) and Battery-Electric Vehicles (BEVs) to provide power to HV components such as electric machines. For safety reasons, HV circuits are required to be both insulated and isolated. Insulation prevents direct contact with the HV circuit while isolation prevents the HV circuit contacting low voltage circuits in the vehicle that often use the body of the vehicle as ground. There is, therefore, a two stage safety system to make safe the use of HV circuits. Loss of isolation represents a risk to vehicle occupants and bystanders because components outside of the insulated HV circuit may become part of the HV circuit and may be contacted by the occupants of and bystanders to the vehicle. Therefore, upon detection of the loss of HV isolation, a controller usually instructs shutdown of the HV circuit, which may be performed immediately or, if the vehicle is moving, may be performed as soon as the vehicle comes to a standstill.

Vehicles having HV circuits may often come into contact with water. During water contact, the HV circuits and HV components might themselves come into contact with or be surrounded by water. Water contacting the HV circuit or components would not necessarily damage the HV circuits or components in the sense of damaging the insulation but could, for example, surround the circuit or components such that an electrical connection is formed between the HV circuit and, for example, the body of the vehicle via the water, therefore removing the isolation of the HV circuit.

Off-road vehicles are able to wade to a threshold depth that is often much higher than the height at which the HV circuits are positioned in the vehicle. HV circuits, albeit insulated, may therefore be submerged in water. Where connections are formed in the circuit, for example at contact terminals of an electric machine, water may cause a reduction or total loss of isolation and so HV circuits are usually shut down for the reasons discussed above.

After contact with water, the cause of the HV circuit isolation loss may be removed because the electrical path through the water is removed. However, by this time, shutdown of the HV circuits has usually been performed or at least initiated. This means that vehicles capable of wading, and other vehicles which may come into contact with water, may be rendered partially or wholly unusable by temporary water contact.

It is against this background that the present invention has been conceived.

SUMMARY OF THE INVENTION

Aspects of the invention relate to a method, system and vehicle as claimed in the appended claims.

According to an aspect of the invention, there is provided a method of controlling an isolated high voltage circuit of a vehicle comprising the high voltage circuit and a low voltage circuit wherein the high voltage circuit is isolated from the low voltage circuit, the method comprising:

detecting a change in an isolation resistance of the high voltage circuit from the low voltage circuit;

detecting a driver input indicative of a desired speed of the vehicle;

operating the high voltage circuit in dependence on the change in the isolation resistance and the driver input.

In an embodiment said driver input comprises an increase in pressure applied to an accelerator pedal or a decrease in pressure applied to the brake pedal, said input being indicative that the desired speed is higher than the current speed.

In an embodiment said driver input comprises a substantially constant input, said input being indicative that the desired speed is substantially equal to the current speed.

According to another aspect of the invention there is provided a method of controlling an isolated high voltage circuit of a vehicle comprising the high voltage circuit and a low voltage circuit wherein the high voltage circuit is isolated from the low voltage circuit, the method comprising:

detecting a change in an isolation resistance of the high voltage circuit from the low voltage circuit;

detecting the presence or absence of a driver input indicative that the driver intends for the vehicle to increase its speed above a threshold speed;

operating the high voltage circuit in dependence on the change in the isolation resistance and the presence or absence of the driver input.

In an embodiment the method further comprises the step of disabling the high voltage circuit before operating the high voltage circuit in dependence on the change in the isolation resistance and the presence or absence of the driver input, wherein operating the high voltage circuit comprises re-enabling the high voltage circuit.

According to a further aspect of the invention, there is provided a method of controlling an isolated high voltage circuit of a vehicle comprising the high voltage circuit and a low voltage circuit wherein the high voltage circuit is isolated from the low voltage circuit, the method comprising:

detecting a change in an isolation resistance of the high voltage circuit from the low voltage circuit;

determining a speed of the vehicle;

operating the high voltage circuit in dependence on the change in the isolation resistance and the speed of the vehicle.

In an embodiment of the invention the method comprises disabling the high voltage circuit before operating the high voltage circuit in dependence on the change in the isolation resistance and the speed of the vehicle, wherein operating the high voltage circuit comprises re-enabling the high voltage circuit. The disabling of the high voltage circuit may be performed before determining the speed of the vehicle.

In an embodiment of the invention, operating the high voltage circuit in dependence on the change in the isolation resistance and the speed of the vehicle, comprises disabling the high voltage circuit.

In an embodiment of the invention the dependence on the speed of the vehicle comprises comparing the speed of the vehicle to a threshold speed, below which the isolated high voltage circuit is disabled in dependence on the change in the isolation resistance. The threshold speed may be in the range of 5 kph to 30 kph.

In an embodiment of the invention, the disabling of the high voltage circuit comprises isolating a high voltage battery from the high voltage circuit. The disabling of the high voltage circuit may comprise reducing a residual current in the isolated high voltage circuit before isolating the high voltage battery from the high voltage circuit.

In an embodiment of the present invention, the method comprises:

determining a status of the vehicle, wherein the high voltage circuit is operated also in dependence on the status of the vehicle. The term status should be understood to indicate whether the vehicle is, for example, wading or the like.

In an embodiment of the invention, the threshold speed is modified in dependence on vehicle status.

The method may comprise:

controlling the vehicle using the low voltage circuit when the high voltage circuit is disabled. In an embodiment of the invention, the method comprises determining a status of a low voltage battery, wherein the high voltage circuit is operated in dependence on the status of the low voltage battery.

In an embodiment of the invention, the method comprises detecting a further change in the isolation resistance of the high voltage circuit and operating the high voltage circuit in dependence on the further change. This provides the advantage of allowing the HV circuit to become operational in the event that the isolations status has improved.

According to an aspect of the invention there is provided a system for controlling an isolated high voltage circuit of a vehicle comprising a high voltage circuit and a low voltage circuit wherein the high voltage circuit is isolated from the low voltage circuit, the system comprising:

a detector arranged to detect a change in the isolation resistance of the high voltage circuit from the low voltage circuit;

a speed sensor arranged to determine a speed of the vehicle;

a controller arranged to operate the high voltage circuit in dependence on the change in the isolation resistance and the speed of the vehicle.

In an embodiment of the invention the isolated high voltage circuit comprises a high voltage battery and contactors having an open and closed state for disconnecting and connecting the high voltage battery in the isolated high voltage circuit respectively, the contactors being controllable by the controller, wherein the controller is arranged to disable the high voltage circuit by opening the contactors.

In an embodiment of the invention, the system comprises:

a vehicle status sensor arranged to determine a status of the vehicle, wherein the controller is arranged to operate the high voltage circuit in dependence on the status of the vehicle.

In an embodiment of the invention, the system comprises:

a low voltage battery status sensor arranged to determine a status of a low voltage battery as part of the low voltage circuit being arranged to control the vehicle, wherein the controller is arranged to operate the high voltage circuit in dependence on the status of the low voltage battery.

According to an aspect of the invention, there is provided a system for controlling an HMI apparatus of a vehicle having a low voltage circuit and an isolated high voltage circuit being isolated from the low voltage circuit, the system comprising:

a detector arranged to detect a change in the isolation resistance of the high voltage circuit from the low voltage circuit;

a speed sensor arranged to determine a speed of the vehicle; and a controller arranged to operate the HMI apparatus in dependence on the change in the isolation resistance and the speed of the vehicle.

In an embodiment of the invention the system for controlling an HMI apparatus comprises:

a vehicle status sensor arranged to detect a status of the vehicle, wherein the controller is arranged to operate the HMI apparatus in dependence on the status of the vehicle.

In an embodiment of the invention the system for controlling an HMI apparatus comprises:

a low voltage battery status sensor arranged to determine a status of a low voltage battery as part of the low voltage circuit being arranged to control the vehicle, wherein the controller is arranged to operate the HMI apparatus in dependence on the status of the low voltage battery.

In another aspect of the invention there is provided a vehicle comprising a system as hereinbefore mentioned.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Embodiments of the invention will now be described, by way of example, with reference to the accompanying drawings, in which.

DETAILED DESCRIPTION

Detailed descriptions of specific embodiments of the system and method of isolated HV circuit control, system of controlling an HMI, and vehicle, of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the system and method of isolated HV circuit control, system of controlling an HMI, and vehicle, described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Hybrid electric vehicles usually comprise a combustion engine and an electric machine, each used to provide power to the wheels of the vehicle. The electric machine is usually a high voltage (HV) component that is part of a high voltage (HV) circuit, which typically operates in the region of 300 v. Accordingly the HV circuit is insulated and isolated from other components of the car. Insulation prevents direct contact with the HV circuit while isolation prevents the HV circuit contacting low voltage (LV) circuits in the vehicle that often use the body of the vehicle as ground. Usually, LV circuits are used to provide electrical power for engine control and other systems that permit the hybrid vehicle to operate in the absence of the HV circuit. LV circuits operate at much lower voltages than HV circuits and may often operate in the region of 12 v. It is important to note that the operation voltage values are not limited to 12 v and 300 v. Instead, it should be noted that the LV circuit operates at a voltage that would not be harmful through human contact whereas the HV circuit operates at a voltage that could be harmful through human contact.

Figure 1:
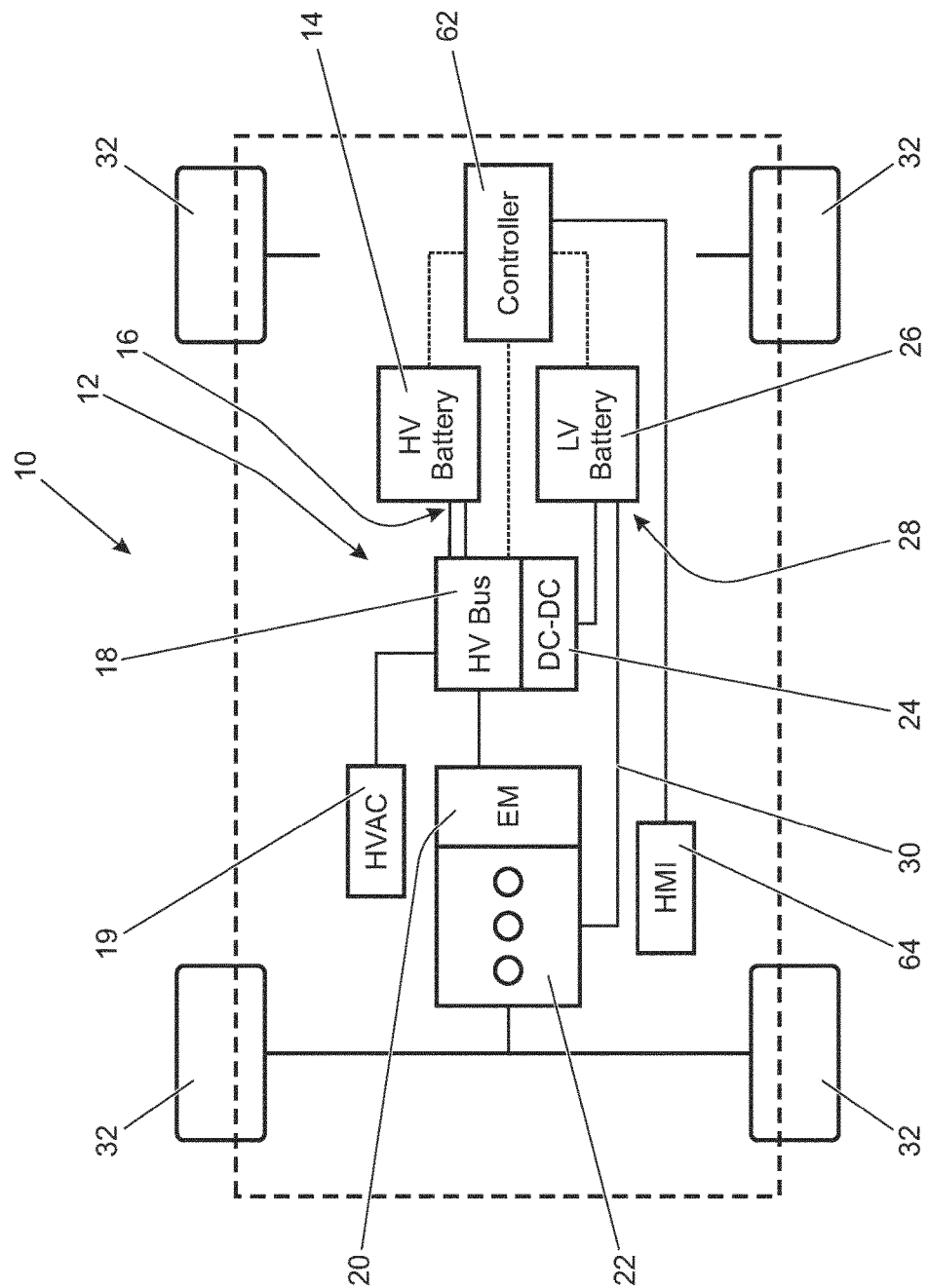
FIG. 1 is a schematic illustration of a vehicle according to an embodiment of the present invention.

FIG. 1 schematically shows a hybrid vehicle 10 comprising an isolated HV circuit 12. The HV circuit comprises an HV battery 14 which is connected into the HV circuit using contactors 16. The contactors have an open and closed state so that in the open state, the battery is disconnected from the remainder of the HV circuit, and in the closed state, the HV battery 14 is connected into the HV circuit 12. Therefore, the contactors are usually opened to remove the main power source of the HV circuit and thus disconnect the HV circuit.

The HV circuit 12 comprises an HV bus 18 arranged to control the HV circuit. Electricity is generated in the HV circuit by an electric machine 20 operating as a generator connected to a combustion engine 22 of the vehicle 10. The electricity generated is used to charge the HV battery 14. Furthermore, a DCDC convertor 24 is attached to the HV Bus 18 to convert the high voltage electricity of the HV circuit to a lower voltage output for charging an LV battery 26, which is part of an LV circuit 28. As hereinbefore mentioned, LV circuits are used to supply electric power to, for example, engine control systems and other essential vehicle control systems. The supply 30 is schematically illustrated in FIG. 1. Both the combustion engine 22 and the electric machine 20, operating as a motor, can supply drive power to the wheels 32 of the vehicle 10 via conventional means that are not explained further herein.

The configuration of the LV battery providing electric power to essential vehicle control systems enables the vehicle to "limp home" when the HV circuit is not in operation such that the LV battery is not being charged. The limp home functionality may not provide for the vehicle to get "home", depending on how far the vehicle is away from its nominal home, but instead is intended to allow the vehicle to get to a safe location. However, in some circumstances, for example when the LV battery is not fully charged before needing to limp home, the vehicle may not be able to get to a safe location. In other examples where the vehicle is off-roading, a safe location may be outside the normal range of a limp home function, such as, for example, when the vehicle is wading. In these circumstances it is desirable to extend the range of the vehicle once the HV circuit is not in operation.

HV circuits are typically isolated to an isolation resistance of approximately 100-500 MΩ/v to protect persons encountering the vehicle from high voltages. The isolation resistance is measured, usually inside the HV battery, using resistors positioned between each of a positive and negative rail of the HV circuit and the ground rail of the LV circuit. A change in isolation resistance indicates that there is a possible isolation fault and the HV circuit is made safe by the battery disconnecting itself from the HV circuit through opening the contactors. This action is also referred to as disabling the HV circuit. Default HV circuit operation provides for disablement after detection of a change in isolation resistance. This means that the vehicle is solely dependent on the LV circuit and will likely be rendered immobile when the vehicle comes to a standstill. One reason for this is that after travelling for a period of time on the LV circuit, the LV battery will be depleted such that restarting the vehicle using a starter motor powered by the LV circuit will no longer be possible. At this point, the vehicle will commonly need mechanical attention.

Figure 2:
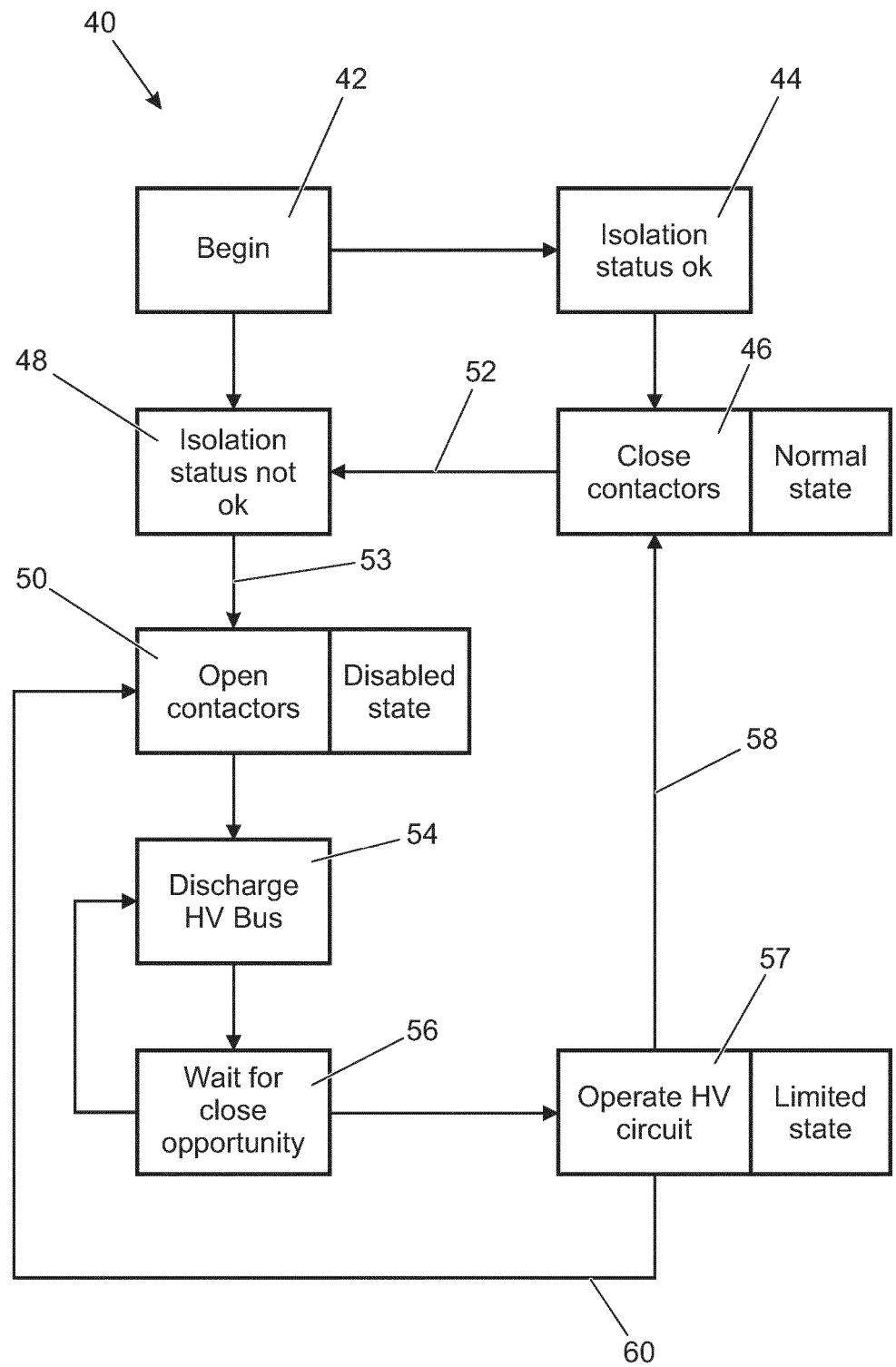
FIG. 2 illustrates a method according to the present invention.

The present invention provides for the vehicle to make use of the HV circuit after detection of a change in isolation resistance. FIG. 2 illustrates a method 40 according to an embodiment of the present invention for controlling an isolated HV circuit of a vehicle 10 (see FIG. 1). On start-up of the vehicle, the method begins 42 by checking the power-down status of the HV circuit. That is to say the status of the HV circuit at the last time the vehicle was switched off. If at power-down the isolation status was ok 44, the HV battery contactors are closed 46 and the HV circuit enabled to operate in a normal state. The method remains in this state during normal operation of the HV circuit and, in turn, the vehicle. Alternatively, on start-up, the method may begin 42 by determining that the power-down status of the HV circuit was not ok 48. This condition may exist if an isolation fault was the cause of the vehicle shut-down. On determining that the isolation status was not ok 48 the HV battery contactors are opened 50. It should be noted that from the beginning 42 of the method, the contactors may not have been closed and thus at 50, the contactors remain open. The method may remain in this state if the HV circuit cannot be enabled.

FIG. 2 further illustrates that the method provides a path 52 for the isolation status to be found to be not ok 48 even after an initial determination that the isolation status was ok and the contactors are closed. The path 52 may be taken following detection of a change in isolation resistance. The change may be, for example, a decrease in isolation resistance. For example, a decrease of 50 MΩ/v in isolation resistance may be used to determine that the isolation status is not ok. On determination that the isolation resistance is no longer ok, the contactors are opened 50.

On or after opening the contactors, the HV bus is discharged 54 to reduce the residual voltage in the HV circuit. It should be noted that the order of 54 and 50 in FIG. 2 may therefore be reversed. In some embodiments, the HV current is reduced before opening the contactors 50 to avoid an electrical arc between terminals of the contactors that may weld the contactors together. This is discussed further below. However, in some circumstances where a large change in isolation resistance is found, it may remain preferable to open the contactors first. Alternatively, the contactors may be opened while simultaneously discharging the HV bus.

Once the contactors are opened 50 and the HV bus is discharged 54, the method according to an embodiment of the present invention waits for a close opportunity 56. A close opportunity may be provided by the isolation resistance changing such that it returns to the normal operating condition, for example 500 MΩ/v. A close opportunity may also be provided by the speed of the vehicle increasing above a threshold speed. At fast speeds, a change in isolation resistance may not be dangerous because it would require someone moving alongside the vehicle to make a connection between the fault point on the vehicle and another point at a different potential. For example, if the isolation change was indicative that part of the HV circuit was contacting the body of the vehicle, a person outside the vehicle would only be at risk if they could move at the speed of the vehicle while forming a connection between the body of the vehicle and ground or another point on the vehicle having a different potential. Therefore, a close opportunity may be provided when the vehicle is moving above a speed threshold of say 15 kph or say 10 mph. In other embodiments, the speed threshold may be lower or higher and is preferably, therefore, in the range of 5 kph to 30 kph or 3 mph to 20 mph. It should be noted that the path 52 for determining that the isolation status is not ok may also be taken in dependence on the vehicle speed such that if the vehicle speed is above the aforementioned threshold, the isolation status is determined to be ok. Alternatively, the path 52 may be taken on determining that there has been a change in isolation resistance but the path 53 (to move to open the contactors) may not be taken if the vehicle speed is above the threshold. In this scenario, the isolation status is known to be not ok but the conditions are such that no further action is needed in the present case.

The speed threshold may be adapted depending on the status, or environmental setting, of the vehicle. For example, if the vehicle is wading, the speed threshold may be lowered because it is more difficult for an external party to keep up with the vehicle while the vehicle is wading. Therefore, the speed threshold may be decreased to, say, 5 kph or 3 mph, for example. The decrease in speed threshold may be as a function of wading depth so that in shallow water the speed threshold is not decreased as much as in deep water.

Once a close opportunity is detected, a timer begins to ensure that the close opportunity is reliable. For example, if a close opportunity is provided by an increase in vehicle speed, the vehicle speed must remain above the threshold for a predefined period of time before the method proceeds. The period of time may be, for example 3 seconds, but may be set at any other period of time. If the close opportunity does not hold true for the predefined time period then the method returns to one of the open contactors 50 and discharge bus 54 steps. The time delay has the advantage that the contactors do not close on any and every occurrence of a close opportunity, which would result in the contactors opening and closing frequently and possible damage to the contactors.

Following the close opportunity satisfying the time condition, the HV circuit enters a limited state 57. In this condition, the EM machine is configured to supply only enough power to, through the DCDC convertor, charge the LV battery such that the LV circuit can continue to power critical vehicle components that enable the vehicle to keep moving. In this condition, the HV battery contactors are closed so as to connect the HV battery to the circuit but non-essential components such as the HVAC 19 are disconnected. In the limited state, the HV bus may measure the isolation resistance of the HV circuit from the LV circuit using means similar to those used by the HV battery and discussed above.

On determination that the isolation resistance has returned to its normal status, the method returns to close the contactors 46 of the battery such that the HV circuit can resume normal operation via path 58. It should be noted that while operating in the limited state, the isolation status may degrade such that the contactors should be opened 50 again via path 60. This situation may also occur if the speed of the vehicle decreases below the aforementioned threshold speed.

Step 50 also represents the disabled state of the HV circuit. At this step, there is no HV circuit operation.

Each of the determinations discussed above are made and controlled by a controller 62 that is coupled with the HV battery, the HV bus and the LV battery. The controller 62 may also be connected to other components, and may be the vehicle controller. It should be noted therefore that the controller is not limited to being a single entity that does not have control functions in other areas of the car.

The controller is also coupled with the HMI 64 of the vehicle. The HMI referred to herein may be, but is not limited to, a display screen that may be mounted on the dashboard of the vehicle 10. The HMI 64 is coupled with the controller 62 so that information about the status of the HV circuit is relayed to the driver of the vehicle. Therefore, an embodiment of the present invention also relates to a method for controlling an HMI of a vehicle.

Figure 3:
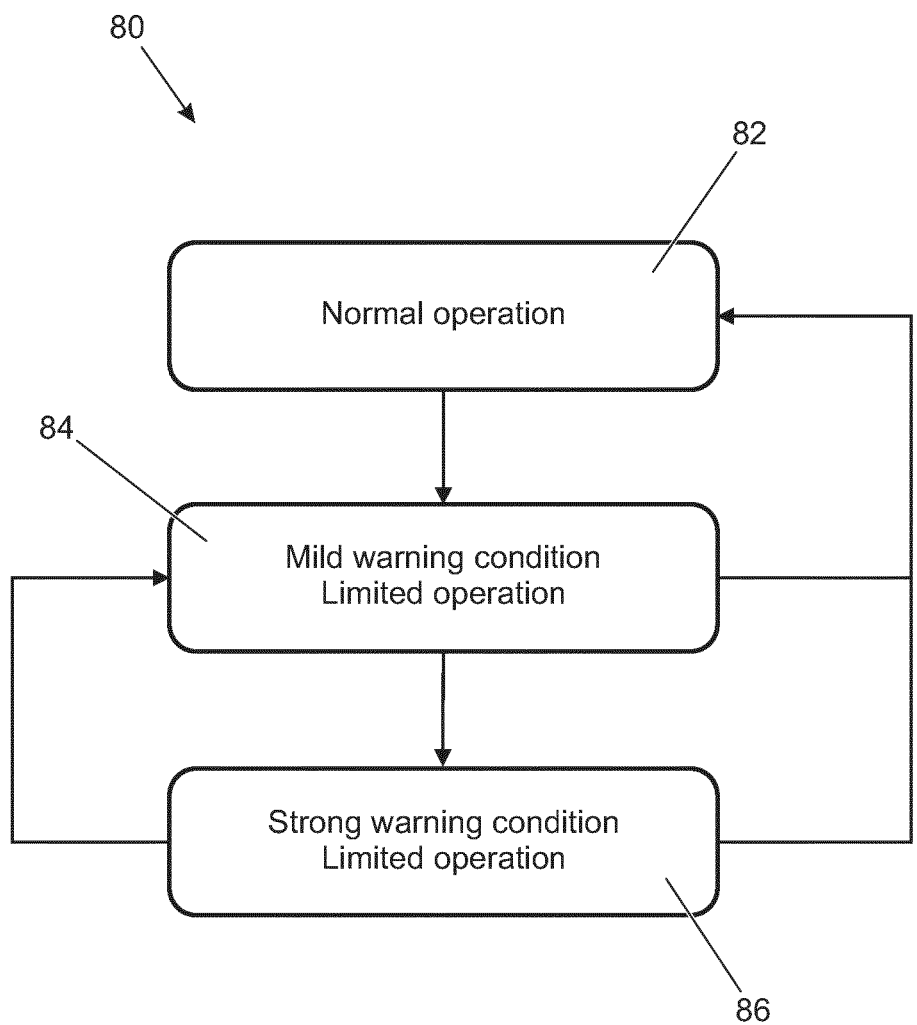
FIG. 3 illustrates a method according to the present invention.

FIG. 3 shows a method, according to an embodiment of the present invention, for controlling an HMI of a vehicle. The method 80 has a normal operating condition 82 wherein the isolation status is ok. This condition relates to the normal state step 46 of FIG. 2. In the normal operating condition the HMI is controlled to not display any warning messages to the driver of the vehicle. The method 80 comprises a mild warning condition 84 wherein the HMI is controlled to display a 'reduced performance' message. This condition corresponds to any of steps 54, 56 or 57 and is a first stage display used where the method 40 passes through steps 48 and 50. From this condition, the driver of the vehicle is informed that the HV circuit has encountered a change in isolation and as a result performance is reduced. Therefore, it is expected that drivers experiencing this condition should move their vehicle to a safe location, or "home" as previously discussed. The vehicle should, however, be able to continue to perform its primary functions while the method 80 is in the mild warning condition 84.

The method 80 comprises a strong warning condition 86 wherein the HMI is controlled to present information to the driver to inform them that there is a 'reduction in performance' and that the 'range of the vehicle is reduced'. When presented with this condition it is expected that drivers will immediately move the vehicle to a safe location, or "home" as previously discussed. The strong warning condition 86 corresponds to the disabled state 50 of the method 40 and may correspond to states 48, 54, 56 or 57 if, for example, the status of the LV battery is poor. As hereinbefore mentioned, in states 48, 50, 54 and 56, the HV circuit is disabled so that there is no LV charging. Thus the LV battery will have a limited supply to power engine control systems and the like and is accordingly reported as a strong warning condition 86.

At any of conditions 82, 84 and 86, the method may move to control the HMI according to any of the other conditions 82, 84 and 86, as indicated by the connecting arrows in FIG. 3. It should be appreciated that the method 80 controls the HMI according to the control of the HV circuit in the method 40 illustrated in FIG. 2.

In another embodiment, the method of the present invention may use a driver indication of a desired vehicle speed as a close opportunity, or one of the paths 52 or 53, for determining that the isolation status is not ok or for opening the connectors once the isolation status has been determined to be not ok, may be taken in dependence on a such a driver indication. The method may consider a close opportunity to have occurred, or the path 52 or 53 may not be taken, if the driver input indicates that they want the vehicle speed to increase its speed above a threshold value, or remain above the threshold speed if the vehicle is already travelling faster than the threshold speed. This embodiment may be applicable to both Hybrid Electric Vehicles (HEVs) and Battery-Electric Vehicles (BEVs), which usually comprise a HV circuit to power an electric machine that is used to provide power to the wheels of the vehicle and a LV circuit that is used to power other vehicle components, for example vehicle control systems or an infotainment system.

Using a driver indication of a desired vehicle speed as a close opportunity does not compromise safety, as the driver will not provide an indication that the vehicle should increase its speed if a person is in a position that would allow them to come into contact with the vehicle. As described below, a warning condition (either strong or mild) is communicated to the driver whenever a change in isolation resistance occurs.

Using a driver indication of a desired vehicle speed as a close opportunity allows the vehicle to use power from the HV battery after a loss in isolation resistance has occurred and the vehicle has fallen below the threshold speed or has stopped entirely. This is particularly advantageous if no auxiliary power source is available, for example in a BEV, as a BEV will be unable to increase its speed above the threshold speed without power from the HV circuit. However, it may also be advantageous in a HEV powered by an electric machine and an engine, because under certain circumstances the engine of a HEV may not be able to deliver power to move the vehicle if the electric machine is not running. This may be because the electric machine is used to power the pumps that provide hydraulic pressure to operate the clutches that connect the engine to the drivetrain, so that whilst the engine may be able to start without the electric machine, it may not be able to deliver power to the wheels to move the vehicle. An auxiliary pump may be provided to provide hydraulic pressure to the clutches that connect the engine to the drivetrain when the HV circuit is disabled. However, such a pump may not be operable under certain circumstances, for example at very low temperature. The auxiliary power source may also fail to power the vehicle if the LV battery becomes depleted, which is likely to occur if the vehicle is powered by the auxiliary power source when the HV circuit is not enabled for a prolonged period, as the HV circuit is used to charge the LV battery. Accordingly, using a driver indication of a desired vehicle speed to determine that it is safe to maintain activity of the HV circuit, or reactivate the HV circuit if it has been disabled, allows a HEV or a BEV to be safely and reliably re-started after a loss of isolation between the HV and LV circuits.

A driver indication of a desired vehicle speed may, for example, comprise applying pressure to the accelerator pedal whilst the vehicle is in gear and the parking brake is not applied, removing pressure from the brake pedal whilst the vehicle is in gear and the parking brake is not applied, removing the parking brake, increasing the pressure applied to the accelerator pedal, or decreasing the pressure applied to the brake pedal. Furthermore, when the vehicle is already travelling at a given speed an unchanged driver input, or the absence of a driver input, may be considered a driver input indicating that the driver does not want the speed of the vehicle to change, and therefore the current speed is the desired speed.

The skilled person will understand that whether or not the speed that the driver desires the vehicle to travel is above or below a threshold value may be estimated within a given confidence interval based on the current speed of the vehicle and the position of the pedals, for example using a statistical model or heuristics. The threshold speed may be between 5 kph (3 mph) and 30 kph (20 mph), and may vary depending upon a state of the vehicle.

Throughout the aforementioned embodiments, the LV battery status may be monitored to determine its state of charge. In the situation where the state of charge of the LV battery is critically low, the method 80 may move to the strong warning condition 86. This could be, for example, when the method 40 is operating in a limited state. As the status of the LV battery improves, the method 80 may move from 86 to the mild warning condition 84 and thus indicate that the vehicle can continue to move but with reduced performance.

Reduced performance may relate only to the loss of HV components such as the HVAC but may also relate to other electrical components that are disabled after detection of a change in isolation resistance. In such an example, a hierarchical ordering of electrical components is used to place highest priority on systems that are required to keep the vehicle moving, e.g. engine control systems.

It should be noted that a HV circuit of a stationary vehicle encountering a change in isolation resistance will be controlled to disable the HV circuit by opening the contactors. This may be via directly opening the contactors and discharging the HV bus. Accordingly the method 80 is used as hereinbefore mentioned when the vehicle is stationary.

The invention claimed is:

1. A method of controlling an isolated high voltage circuit of a vehicle comprising the high voltage circuit and a low voltage circuit wherein the high voltage circuit is isolated from the low voltage circuit, the method comprising:
   detecting a change in an isolation resistance of the high voltage circuit from the low voltage circuit;
   performing one of determining a speed of the vehicle and detecting a driver input indicative of a desired speed of the vehicle; and
   disabling the high voltage circuit before operating the high voltage circuit in dependence on the change in the isolation resistance and the speed of the vehicle or the driver input indicative of a desired speed of the vehicle, wherein operating the high voltage circuit comprises re-enabling the high voltage circuit.

2. A method according to claim 1, wherein operating the high voltage circuit in dependence on the change in the isolation resistance and the speed of the vehicle, comprises disabling the high voltage circuit.

3. A method according to claim 1, wherein disabling the high voltage circuit in dependence on the speed of the vehicle comprises comparing the speed of the vehicle to a threshold speed, below which the isolated high voltage circuit is disabled in dependence on the change in the isolation resistance.

4. A method according to claim 1, wherein the disabling of the high voltage circuit comprises isolating a high voltage battery from the high voltage circuit.

5. A method according to claim 1, comprising:
   controlling the vehicle using the low voltage circuit when the high voltage circuit is disabled.

6. A method according to claim 5, comprising determining a status of a low voltage battery, wherein the high voltage circuit is operated in dependence on the status of the low voltage battery.

7. A method according to claim 1, comprising detecting a further change in the isolation resistance of the high voltage circuit and operating the high voltage circuit in dependence on the further change.

8. A system for controlling an isolated high voltage circuit of a vehicle comprising a high voltage circuit and a low voltage circuit wherein the high voltage circuit is isolated from the low voltage circuit, the system comprising:
   a detector arranged to detect a change in an isolation resistance of the high voltage circuit from the low voltage circuit;

a speed sensor arranged to determine a speed of the vehicle; and a controller arranged to disable the high voltage circuit in dependence on the change in isolation resistance and the speed of the vehicle and re-enable the high voltage circuit in dependence on the speed of the vehicle increasing above a threshold speed.

9. A system according to claim 8, wherein the isolated high voltage circuit comprises a high voltage battery and contactors having an open and closed state for respectively disconnecting and connecting the high voltage battery in the isolated high voltage circuit, the contactors being controllable by the controller, wherein the controller is arranged to disable the high voltage circuit by opening the contactors.

10. A system according to claim 8, comprising:

a vehicle status sensor arranged to determine a status of the vehicle, wherein the controller is arranged to operate the high voltage circuit in dependence on the status of the vehicle.

11. A system according to claim 8, comprising:

a low voltage battery status sensor arranged to determine a status of a low voltage battery as part of the low voltage circuit being arranged to control the vehicle, wherein the controller is arranged to operate the high voltage circuit in dependence on the status of the low voltage battery.

12. A system for controlling a human machine interface (HMI) apparatus of a vehicle having a low voltage circuit and an isolated high voltage circuit being isolated from the low voltage circuit, the system comprising:

a detector arranged to detect a change in an isolation resistance of the high voltage circuit from the low voltage circuit;

a speed sensor arranged to determine a speed of the vehicle; and a controller arranged to operate the HMI apparatus in dependence on the change in the isolation resistance and the speed of the vehicle.

13. A system according to claim 12, comprising:

a vehicle status sensor arranged to detect a status of the vehicle, wherein the controller is arranged to operate the HMI apparatus in dependence on the status of the vehicle.

14. A system according to claim 12, comprising:

a low voltage battery status sensor arranged to determine a status of a low voltage battery as part of the low voltage circuit being arranged to control the vehicle, wherein the controller is arranged to operate the HMI apparatus in dependence on the status of the low voltage battery.

15. A vehicle comprising a system as claimed in claim 12.

16. A method of controlling an isolated high voltage (HV) circuit of a vehicle comprising the high voltage circuit and a low voltage circuit wherein the high voltage circuit is isolated from the low voltage circuit, the method comprising:

upon vehicle power-up detecting a power-down status of HV circuit isolation; if the power-down status of the HV circuit isolation was in a first condition, enabling the HV circuit;

if the power-down status of the HV circuit isolation was in a second, different condition, waiting for a driver input indicative that the driver intends for the vehicle to increase its speed above a threshold value, and subsequently performing an isolation check to determine a current status of the HV circuit isolation.

17. The method of claim 16, wherein said driver input comprises one of:

an increase in pressure applied to an accelerator pedal;
a decrease in pressure applied to a brake pedal; and
deactivating a parking brake.

18. A method of controlling an isolated high voltage circuit of a vehicle comprising the high voltage circuit and a low voltage circuit wherein the high voltage circuit is isolated from the low voltage circuit, the method comprising:

detecting a change in an isolation resistance of the high voltage circuit from the low voltage circuit;

detecting presence or absence of a driver input indicative that the driver intends for the vehicle to increase its speed above a threshold value; and operating the high voltage circuit in dependence on the change in the isolation resistance and the presence or absence of the driver input.

19. The method of claim 18, comprising disabling the high voltage circuit before operating the high voltage circuit in dependence on the change in the isolation resistance and the presence or absence of the driver input, wherein operating the high voltage circuit comprises re-enabling the high voltage circuit.

* * * * *